United States Patent [19]

Clampitt et al.

[11] 3,908,760

[45] Sept. 30, 1975

[54] METHOD OF TREATING SUBTERRANEAN FORMATIONS WITH AQUEOUS GELS

[75] Inventors: Richard L. Clampitt; James E. Hessert, both of Bartlesville, Okla.

[73] Assignee: Phillips Petroleum Company, Bartlesville, Okla.

[22] Filed: Oct. 9, 1973

[21] Appl. No.: 404,746

[52] U.S. Cl. ............... 166/246; 166/270; 166/294; 166/308; 175/65
[51] Int. Cl.$^2$ ................ E21B 33/138; E21B 43/22; E21B 43/26; E21B 21/04
[58] Field of Search .......... 166/246, 270, 274, 275, 166/294, 283, 307, 308; 252/8.55 D, 8.55 R, 8.5 A, 8.5 C, 316

[56] References Cited
UNITED STATES PATENTS

| 3,251,781 | 5/1966 | Jordan | 252/316 |
|---|---|---|---|
| 3,383,307 | 5/1968 | Goetz | 252/316 |
| 3,581,824 | 6/1971 | Hurd | 166/270 |
| 3,625,889 | 12/1971 | Branscum | 252/316 X |
| 3,699,042 | 10/1972 | Browning et al. | 175/65 |
| 3,727,689 | 4/1973 | Clampitt | 166/283 |
| 3,728,259 | 4/1973 | Christman | 175/65 |
| 3,749,172 | 7/1973 | Hessert et al. | 166/270 X |
| 3,757,863 | 9/1973 | Clampitt et al. | 166/270 X |
| 3,762,476 | 10/1973 | Gall | 166/270 X |
| 3,766,983 | 10/1973 | Chiu | 166/270 X |

FOREIGN PATENTS OR APPLICATIONS

| 976,224 | 11/1964 | United Kingdom |
|---|---|---|
| 7,105,661 | 6/1972 | Netherlands |

*Primary Examiner*—Stephen J. Novosad

[57] ABSTRACT

Improvements in secondary recovery operations for the recovery of oil, and other oil field operations wherein subterranean formations are contacted with a fluid medium, are accomplished through the use of aqueous mediums comprising new aqueous gels prepared from water and biopolysaccharides.

18 Claims, No Drawings

METHOD OF TREATING SUBTERRANEAN FORMATIONS WITH AQUEOUS GELS

This invention relates to new aqueous gels and uses thereof.

The secondary recovery of oil from oil-bearing or containing subterranean formations by fluid drive processes wherein a fluid is injected into the formation via one or more injection wells to drive the oil through the formation to one or more production wells is a well-known process. Fluids used in such processes include liquids, such as water and various hydrocarbons, and gases such as hydrocarbon gases, carbon dioxide, etc. Many oil reservoirs comprise layers or zones of porous rock which can vary in permeability from more than 1,000 millidarcys to less than 10 millidarcys. In all fluid drive processes a recognized problem is the predilection of the drive fluid to channel along or through the more permeable zones of the formation. This is commonly referred to as fingering. The more conductive zones, after the oil has been largely displaced therefrom, function as "thief zones" which permit the drive fluid to channel directly from injection to production wells. In many instances, such channeling or fingering results in leaving substantial quantities of oil in the less permeable zones of the formation which are bypassed. Such channeling or fingering can occur when the mobility, i.e., the quotient of the reservoir's permeability to the drive fluid divided by the viscosity of the drive fluid, becomes large relative to the mobility of the reservoir oil.

Another problem frequently encountered in such fluid drive processes is the more or less direct channeling of relatively large quantities of the drive fluid from the injection well to the producing well(s), caused by the existence of natural or man made fractures in the formation. This problem is recognized as different and/or distinct from the problem discussed in the preceding paragraph, and requires different techniques for the elimination of the problem.

The problem of channeling of fluids through fractures in formations is not confined to secondary recovery operations. In some instances, fractures communicating with an aquifer adjacent a hydrocarbon-bearing formation, and also communicating with said hydrocarbon-bearing formation, will cause water or brine to be produced in excessive amounts along with the hydrocarbon. Various modifications of the problem are sometimes referred to as coning.

Drilling fluids used in the drilling of oil wells, gas wells, and similar boreholes are commonly aqueous liquids containing clays or other colloidal materials. The drilling fluid serves as a lubricant for the bit and drill stem, as a carrying medium for the cuttings produced by the drill bit, and assists in the formation of a filter cake on the wall of the borehole for the reduction of fluid losses to the surrounding subsurface strata. It is known that excessive viscosity in the drilling fluid has an adverse effect on the penetration rate obtained by the drill bit. In many instances, substantially better rates can be secured by eliminating colloidal materials and reducing the viscosity of the drilling fluid. In some instances, air, clear water, or other similar fluid of low viscosity can be used in the place of the ordinary drilling fluid or mud.

Hydraulic fracturing of subterranean formations penetrated by a bore hole has been widely employed for increasing the production of hydrocarbon fluids, e.g., crude oil, natural gas, from said formations. Hydraulic fracturing comprises the injection of a fracturing fluid down a well penetrating a formation, and into said formation under sufficient pressure to overcome the pressure exerted by the overburden. This results in creating a fracture in said formation which facilitates flow of hydrocarbons through the formation and into the well.

Desirable properties of a hydraulic fracturing fluid include high viscosity, low fluid loss, low friction loss during pumping into the well, stability under the conditions of use such as in high temperature deep wells, and ease of removal from the fracture and well after the operation is complete. It would be desirable to have a fracturing fluid possessing all of these properties.

The present invention provides a solution for the above-descibed problems. We have now discovered a class of new aqueous gels which can comprise at least a portion of the aqueous medium used in said secondary recovery operations, and at least a portion of the aqueous medium used in said well drilling operations. Aqueous gels prepared in accordance with the invention are also useful for plugging fractures in formations, for forming fractures in formations, and as fracturing "pads" in combination fracturing-acidizing treatments of formations.

We have discovered that water-dispersible biopolysaccharides when used in combination with a water-soluble compound of a polyvalent metal which can be reduced to a lower polyvalent valence state and a suitable reducing agent capable of reducing said polyvalent metal to said lower polyvalent valence state can be used as gelling agents to gel aqueous mediums comprising water. We have discovered that by varying the composition and/or amounts of said gelling agents, and/or the conditions under which they are used in forming the gels, a wide range of aqueous gels ranging from liquid highly mobile gels to rigid gels can be produced.

The aqueous gels of the invention are particularly useful in operations wherein a fluid medium is introduced into a borehole in the earth, e.g., in the above-described secondary recovery operations, in the above-described well drilling operations, in well completion operations, as packer fluids, in formation fracturing operations, etc.

Thus, according to the invention, there is provided in a method wherein a fluid medium is introduced into a borehole in the earth and into contact with a subterranean formation penetrated by said borehole, the improvement wherein at least a portion of said fluid medium comprises an aqueous gel, and wherein said gel comprises water having incorporated therein: a water thickening amount of a water-soluble biopolysaccharide produced by the action of bacteria of the genus Xanthomonas on a carbohydrate; an amount of a water-soluble compound of a polyvalent metal wherein the metal present is capable of being reduced to a lower polyvalent valence state and which amount is sufficient to cause gelation of said water when the valence of at least a portion of said metal is reduced to said lower valence state; and an amount of a water-soluble reducing agent which is effective to reduce at least a portion of said metal to said lower valence state.

Further according to the invention, there is provided an aqueous medium, comprising: water; a water-thickening amount of a biopolysaccharide produced by the action of bacteria of the genus Xanthomonas on a carbohydrate; an amount of a water-soluble compound of a polyvalent metal wherein the valence state of the metal therein is capable of being reduced to a lower polyvalent valence state and which is within the range of from 0.1 to 60 weight percent, based on the weight of said polysaccharide; and an amount of a water-soluble reducing agent which is effective to reduce at least a portion of said metal to said lower valence state.

Still further according to the invention, there is provided a method for producing an aqueous gel, which method comprises: thickening water by adding thereto a thickening amount of a biopolysaccharide produced by the action of bacteria of the genus Xanthomonas on a carbohydrate; and causing gelation of the so-thickened water by adding thereto an amount of a water-soluble compound of a polyvalent metal wherein the valence state of the metal therein is capable of being reduced to a lower polyvalent valence state and which is within the range of from 0.1 to 60 weight percent, based on the weight of said polysaccharide, and an amount of a water-soluble reducing agent which is effective to reduce at least a portion of said metal to said lower valence state.

The biopolysaccharides which can be used in preparing the aqueous gels of the invention include those produced by the action of bacteria of the genus Xanthomonas on carbohydrates. These materials are thus biochemically synthesized polysaccharides and can be referred to as biopolysaccharides to distinguish them from naturally occurring polysaccharides. Representative species of said Xanthomonas bacteria include *Xanthomonas begoniae*, *Xanthomonas campestris*, *Xanthomonas carotae*, *Xanthomonas corylina*, *Xanthomonas gummisudans*, *Xanthomonas hederae*, *Xanthomonas incanae*, *Xanthomonas lespedezae*, *Xanthomonas malvacearum*, *Xanthomonas holcicola*, *Xanthomonas papavericola*, *Xanthomonas phaseoli*, *Xanthomonas pisi*, *Xanthomonas translucens*, *Xanthomonas vasculorum* and *Xanthomonas vesicatoria*. It has been shown in the prior art that the production of such biopolysaccharides is a characteristic trait of members of the Xanthomonas genus. Certain species produce the polymers with particular efficiency and are thus preferred. These preferred species include *Xanthomonas begoniae*, *Xanthomonas campestris*, *Xanthomonas incanae*, and *Xanthomonas pisi*.

A wide variety of carbohydrates can be fermented with bacteria of the genus Xanthomonas to produce said biopolysaccharides. Suitable carbohydrates include sucrose, glucose, maltose, fructose, lactose, galactose, soluble starch, corn starch, potato starch, and the like. The prior art has also shown that the carbohydrates need not be in a highly refined state and that crude materials from natural sources can be utilized. Examples of suitable such natural source materials include crude molasses, raw sugar, raw potato starch, sugar beet juice, and the like. Since they are much less expensive than the corresponding refined carbohydrates, such natural source materials are usually preferred for use as the substrate in preparing said biopolysaccharides.

Fermentation of the carbohydrate to produce said biopolysaccharides can be carried out in an aqueous medium containing from about 1 to 5 percent of the carbohydrate, from about 0.1 to 0.5 weight percent of dipotassium acid phosphate, and from about 0.1 to 10 weight percent of a suitable nutrient containing suitable trace elements and organic nitrogen sources. Commercially available distillers solubles such as "Stimuflav" sold by Hiram Walker and Sons is an example of such a nutrient. Some of the crude carbohydrate sources mentioned above, such as raw sugar beet juice, apparently contain the trace elements and organic nitrogen sources in sufficient quantity to make the addition of a nutrient unnecessary. It has been reported that good results have been obtained with raw sugar beet juice without the addition of a nutrient. The fermentation is usually carried out at a temperature between about 70° and 100°F for about 1 to about 3 days after sterilizing the medium and inoculating it with bacteria of the genus Xanthomonas. Further details regarding the preparation of said biopolysaccharides can be found in U.S. Pat. Nos. 3,020,206, issued Feb. 6, 1962; 3,243,000 issued Mar. 29, 1966; and 3,163,602 issued Dec. 29, 1964. Polysaccharide B–1459 is an example of a biopolysaccharide produced by the action of *Xanthomonas campestris* bacteria, and which is commercially available in various grades under the trademark "Kelzan" from the Kelco Company, Los Angeles, Cal.

The amount of biopolysaccharide used in the practice of the invention can vary depending upon the particular biopolysaccharide used, and properties desired in the aqueous gels of the invention. In general, the amount of biopolysaccharide used will be a water-thickening amount, i.e., at least an amount which will significantly thicken the water to which it is added. For example, amounts in the order of 25 to 100 parts per million by weight (0.0025 to 0.01 weight percent) have been found to significantly thicken water. Water containing 25 ppm of Kelzan MF, a biopolysaccharide produced by the action of *Xanthomonas campestris* on a carbohydrate has a viscosity increase of about 20 percent when measured on a model LVT-UL Brookfield viscometer at 6 rpm. At 50 ppm the viscosity increase is about 265 percent. At 100 ppm the viscosity increase is about 530 percent. Generally speaking, amounts in the range of from 0.0025 to 5, preferably from 0.01 to 2, more preferably 0.025 to 1, weight percent, based on the weight of water, can be used. However, amounts outside said ranges can be used. In general, with the proper amounts of polyvalent metal and reducing agent, the amount of biopolysaccharide used will determine the consistency of the gel obtained. Generally speaking, small amounts of biopolysaccharide will usually produce liquid mobile gels which can be readily pumped whereas large amounts of biopolysaccharide will usually produce stiff rigid gels. If desired, said stiff gels can be "thinned" by dilution to any desired concentration of biopolysaccharide. This can be done by mechanical means, e.g., stirring, pumping, or by means of a suitable trubulence including device to cause shearing, such as a jet nozzle. Thus, there is really no fixed upper limit on the amount of biopolysaccharide which can be used. However, when a liquid mobile gel is desired, it is preferred to dilute the more concentrated gels before they become rigid.

Metal compounds which can be used in the practice of the invention are water-soluble compounds of polyvalent metals wherein the metal is present in a valence state which is capable of being reduced to a lower polyvalent valence state. Examples of such compounds include potassium permanganate, sodium permanganate, ammonium chromate, ammonium dichromate, the alkali metal chromates, the alkali metal dichromates, and chromium trioxide. Sodium dichromate and potassium dichromate, because of low cost and ready availability, are the presently preferred metal-containing compounds for use in the practice of the invention. The hexavalent chromium in said chromium compounds is reduced in situ to trivalent chromium by suitable reducing agents, as discussed hereinafter. In the permanganate compounds the manganese is reduced from +7 valence to +4 valence as in $MnO_2$.

The amount of said metal-containing compounds used in the practice of the invention will be a sensible amount, i.e., a small but finite amount which is more than incidental impurities, but which is effective or sufficient to cause subsequent gelation when the metal in the polyvalent metal compound is reduced to a lower polyvalent valence state. The lower limit of the concentration of the starting metal-containing compound will depend upon several factors including the concentration of the biopolysaccharide in the water to be gelled, the water which is used, the type of gel product desired, and the desired use of the gel. For similar reasons, the upper limit on the concentration of the starting metal-containing compound also cannot always be precisely defined. However, it should be noted that excessive amounts of the starting metal compound, for example +6 chromium, which can lend to excessive amounts of +3 chromium when there is sufficient reducing agent present to reduce the excess +6 chromium, can adversely affect the stability of the gels produced. As a general guide, the amount of the starting polyvalent metal-containing compound used in preparing aqueous gels in accordance with the invention will be in the range of from 0.1 to 60, preferably 0.5 to 30, weight percent of the amount of biopolysaccharide used. When it is desired to obtain sufficient gelation to cause an increase in the viscosity of the solution being gelled it will usually be preferred to use an amount of the starting polyvalent metal-containing compound which is within the range of from about 4 to 30 weight percent of the amount of biopolysaccharide used. However, in some situations it may be desirable to use amounts of the starting polyvalent metal-containing compound which are outside the above ranges. Such use is within the scope of the invention. Those skilled in the art can determine the amount of starting polyvalent metal-containing compound to be used by simple experiments carried out in the light of this disclosure. For example, we have discovered that when brines, such as are commonly available in producing oil fields, are used as the water in preparing gels in accordance with the invention, less of the starting polyvalent metal-containing compound is required than when distilled water is used. Stable gels have been prepared using brines having a wide range of dissolved solids content, e.g., from 850, 1,200, 6,000 and 90,000 ppm dissolved solids. Gelation rates are frequently faster when using said brines. Such oil field brines commonly contain varying amounts of sodium chloride, calcium chloride, magnesium chloride, etc. Sodium chloride is usually present in the greatest concentration. The word "water" is used generically herein and in the claims, unless otherwise specified, to include such brines, fresh water, and other aqueous media which can be gelled in accordance with the invention.

Suitable reducing agents which can be used in the practice of the invention include water-soluble sulfur-containing compounds such as sodium sulfite, sodium hydrosulfite, sodium metabisulfite, potassium sulfite, sodium bisulfite, potassium metabisulfite, sodium sulfide, sodium thiosulfate, ferrous sulfate, thioacetamide, and others; and nonsulfur-containing compounds such as hydroquinone, ferrous chloride, p-hydrazinobenzoic acid, hydrazine phosphite, hydrazine dichloride, and others. Some of the above reducing agents act more quickly than others, for example sodium thiosulfate usually reacts slowly in the absence of heat, e.g., requiring heating to about 125°–130°F. The presently most preferred reducing agents are sodium or potassium hydrosulfite, sodium or potassium sulfite, sodium or potassium bisulfite, sodium or potassium metabisulfite, and sodium or potassium thiosulfate.

The amount of reducing agent to be used in the practice of the invention will be a sensible amount, i.e., a small but finite amount which is more than incidental impurities, but which is effective or sufficient to reduce at least a portion of the higher valence metal in the starting polyvalent metal-containing compound to a lower polyvalent valence state. Thus, the amount of reducing agent to be used depends, to some extent at least, upon the amount of the starting polyvalent metal-containing compound which is used. In many instances, it will be preferred to use an excess of reducing agent to compensate for dissolved oxygen in the water, exposure to air during preparation of the gels, and possible contact with other oxidizing substances such as might be encountered in field operations. As a general guide, the amount of reducing agent used will generally be within the range of from 0.1 to at least 150, preferably at least about 200, weight percent of the stoichiometric amount required to reduce the metal in the starting polyvalent to said lower polyvalent valence state, e.g., +6 Cr to +3 Cr. However, in some instances, it may be desirable to use amounts of reducing agent outside said ranges. The use of such amounts is within the scope of the invention. Those skilled in the art can determine the amount of reducing agent to be used by simple experiments carried out in the light of this disclosure.

Various methods can be used for preparing the aqueous gels of the invention. Either the metal-containing compound or the reducing agent can be first added to a solution of the biopolysaccharide in water or other aqueous medium, or said metal-containing compound and said reducing agent can be added simultaneously to the solution or aqueous medium containing the biopolysaccharide. Generally speaking, where convenient, the preferred method is to first disperse the biopolysaccharide in the water or other aqueous medium. The metal-containing compound is then added to the dispersion of biopolysaccharide, with stirring. The reducing agent is then added to the solution or aqueous medium containing the biopolysaccharide and the oxidizing agent, with sitrring. Gelation starts as soon as reduction of some of the higher valence metal in the starting polyvalent metal-containing compound to a lower valence state occurs. It is not intended to limit the invention by any theories as to the reaction mechanisms involved. However, it is presently believed that the newly formed lower valence metal ions, for example +3 chromium obtained from +6 chromium, effect rapid crosslinking of the biopolysaccharide which results in gelation of the solution or aqueous medium containing same.

It is also within the scope of the invention to prepare a dry mixture of the biopolysaccharide, the metal-containing compound, and the reducing agent, in proper proportions, and then add this dry mixture to the proper amount of water.

An advantage of the invention is that ordinary ambient temperatures and other conditions can be used in practically all instances in preparing the aqueous gels of the invention or aqueous mediums containing same. However, in some instances, a small amount of heat may be desirable to aid in the formation of the gel, e.g., heating to a temperature of about 125°–130°F.

Aqueous gels in accordance with the invention can be prepared having a wide range of viscosities, or firmness, ranging from low viscosity or highly mobile gels having a relatively low viscosity up to firm or rigid gels which are nonmobile. The choice of gel viscosity or concentration will depend upon the use to be made of the gel. The actual viscosity and/or gel strength of the gel will depend upon the concentration of the biopolysaccharide, the type and amount of starting polyvalent metal compound used, the type and amount of reducing agent used, and the type of water used.

One presently preferred procedure is to prepare a relatively concentrated or high viscosity gel and dilute same to a viscosity or concentration suited for the actual intended use of the gel. When employing said dilution technique a starting solution of biopolysaccharide containing, for example, 1,000 to 10,000 ppm (0.1 to 1 wt.%) of biopolysaccharide can be used. This solution is then gelled by the addition of suitable amounts of polyvalent metal compound and reducing agent. After gelation has proceeded to the desired extent, the resulting gel can be diluted to the concentration or viscosity most suited for its intended use. For example, if the gel is to be used in a waterflood operation, it could be diluted to a nominal 2,000, 1,000, 500, 250, or less, ppm gel by the addition of a suitable amount of water. The more concentrated biopolysaccharide solutions usually have a faster rate of gelation. Thus, in most instances, it will be preferred to carry out the dilution soon after the components of the gel have been added to the water or other aqueous medium, e.g., within about 5 to 30 minutes. Preferably, the concentration of the biopolysaccharide in the "concentrated gel" will be at least twice that in the final gel. Dilution of the gel retards the rate of gelation. Thus, this dilution technique can be employed be control the gelation rate, if desired. In many instances, gels prepared by employing said dilution technique are more stable. Another advantage of said dilution technique is that it is usually more convenient to weigh out and handle the larger quantities of reagents.

We are aware that chromium ions having a valence of +3 have been used to react with water-dispersible polymers such as polyacrylamides and polysaccharides. See, for example, U.S. Pat. No. 3,114,651 to Gentile, U.S. Pat. No. 3,383,307 to Goetz, and U.S. Pat. No. 3,233,000 to Patton et al. In such processes the chromium compound is added in a form wherein the chromium has an initial valence of +3, e.g., $CrCl_3$, $Cr(NO_3)_3$, etc. As shown by example hereinafter, we have found that when using thus-obtained $Cr^{+3}$ ions, more biopolysaccharide is required to obtain gels of a given viscosity. Thus, newly reduced $Cr^{+3}$ ions are more efficient gelling agents. We have also observed that gelled solutions of biopolysaccharides produced by using $Cr^{+3}$ ions newly reduced from $Cr^{+6}$ are more stable gels than are the gels produced by using chromium having an initial valence of +3. In the practice of the present invention, the $Cr^{+3}$ ions must be newly formed, e.g., nascent ions formed in situ in the solution to be gelled.

Gel instability is evidenced by precipitation and/or syneresis (bleeding or water separation). A severe test of gel stability is to prepare the gel and merely allow it to stand. We have found that gels which are stable for as long as 48 hours are usually stable for a month or longer.

In general, pH is not controlling, but higher pH values retard gelation rate. In general, the pH of the gelling solution will depend upon the reducing agent used. If desired, the pH can be adjusted by the addition of a suitable acid, depending upon the reducing agent used.

Herein and in the claims, unless otherwise specified, the aqueous gels of the invention are defined for convenience, and not by way of limitation, in terms of the amount of biopolysaccharide contained therein, irrespective of whether or not all the biopolysaccharide is crosslinked. For example, a 1 weight percent or 10,000 ppm gel is a gel which was prepared from a starting biopolysaccharide solution which contained 1 weight percent or 10,000 ppm by weight of biopolysaccharide. The same system is employed for the gels prepared by the above-described dilution technique.

As indicated above, the aqueous gels of the invention are particularly useful in fluid drive operations for the secondary recovery of oil. The gels of the invention are applicable to decreasing the mobility of a drive fluid, such as water, or decreasing the permeability of formations prior to or during secondary recovery operations, such as fluid drive processes, and also for water shutoff treatments in producing well. In one embodiment of the invention, a conventional waterflood or gas drive is carried out in conventional manner until the drive fluid breaks through into the production well in excessive amounts. A gel of the invention is then pumped down the well and into the formation in any suitable manner, any suitable amount, and for any desired period of time sufficient to obtain the desired in-depth penetration and decrease in mobility of the drive fluid, or decrease in permeability of the high permeability zones of the formation. Usually, an in-depth penetration of from 10 to 1,000, preferably 75 to 900, feet from the injection well will be sufficient. However, this can vary from formation to formation and penetrations outside said ranges can be used. For example, there can be injected into the formation via the injection well from about 0.001 to about 0.5 pore volume of a gel in accordance with the invention over a suitable period of time ranging from 1 day to 6 months. Or, the injection of the gel can be carried out by injecting a slug of about 200 to 5,000 barrels of gel into the well and then into the formation. Injection in one of the above manners will provide a flood front adjacent the oil to be produced. If desired, an ordinary brine or water can then be employed to drive this slug or band or front of gel on through the formation to the production well. If desired, in order to avoid any sharp demarcations in viscosity or mobility of the gel, which could adversely affect the relative mobility of the flood medium and the oil, and cause channeling, the viscosity or concentration of the gel can gradually be lessened through a series of incremental decreases rather than discontinuing the injection thereof abruptly.

In another embodiment of the invention, the formation can be treated prior to carrying out the fluid drive secondary recovery operations. This embodiment is particularly applicable where there is a good knowledge of the nature of the formation. Thus, in a formation where the oil-bearing strata are interspersed with more permeable porous strata which contain no oil, or an insufficient amount of oil to make secondary recovery operations economical, but which more permeable strata would still act as a thief zone, the formation can be treated in accordance with the invention prior to initiating the fluid drive operation.

In still another embodiment, the invention can be applied to producing well, either oil wells or gas wells, where there is a more porous nonhydrocarbon-bearing strata adjacent the hydrocarbon-bearing strata. For example, such a condition can exist where there is a water sand adjacent the hydrocarbon-bearing sand and the water intrudes into the borehole and interferes with the production of hydrocarbon. In such instances, the formation can be treated in accordance with the invention to shut off the flow of water. The method of carrying out such a water shutoff treatment is substantially the same as described above in connection with fluid drive operations.

It is also within the scope of the invention to carry out the gel injection techniques of the invention periodically or intermittently, as needed, during the course of a fluid drive secondary operation, or during the production of oil from a producing well.

In all of the above operations, the injection of the gel of the invention can be carried out in conventional manner. If desired, a gel of suitable viscosity or concentration can be injected as the drive fluid per se. Gels injected in accordance with the invention can be prepared in advance, stored in suitable tanks, and then pumped into the well. Or, said gels can be formed in a conduit leading to the injection well, or in the tubing in the well itself, and then injected into the formation. Thus, the required amounts of polyvalent metal compound and reducing agent can be metered into a said conduit, or the tubing in the well, mixed therein with a solution of biopolysaccharide, and then injected into the formation. If desired, selected portions of the formation can be isolated mechanically, as by the use of packers, and other means known to the art, for treatment in accordance with the invention.

The aqueous gels of the invention can comprise, or can be employed as, drilling fluids in the drilling of wells in any manner known to the art for the use of drilling fluids. Such gels can be employed without the addition of other materials thereto. However, if desired, weighting agents such as barium carbonate, barium sulfate, amorphous silica, etc., can be included in the drilling fluids comprising said aqueous gels. If desired, other additives compatible with the aqueous gels can also be included in the drilling fluid. Thus, the drilling fluids can include clays such as bentonite, attapulgus clay, fluid loss agents, etc. It should be understood that not all of these additives or constituents will necessarily be present in any one drilling fluid and that the amount of any particular additive used will be governed by the other constituents present under the particular well conditions existing. As indicated, in selecting such additives for use in a particular drilling fluid, care should be taken to avoid materials which are not compatible with the aqueous gels. The use of such additives will be governed in part by the viscosity and fluid loss properties desired in the drilling fluid. Thus, as is the situation in connection with conventional drilling fluids, pilot tests should be run to determine the properties desired for the aqueous gel used as the drilling fluid, or an aqueous gel containing one of the above-described additives, to determine the optimum results or properties desired for the drilling fluid under the particular well conditions existing.

As indicated above, aqueous gels prepared in accordance with the invention are useful in forming fractures in formations, and also as fracturing "pads" in combination fracturing-acidizing treatments of formations. When it is desired to use a gel of the invention as a fracturing fluid, a said gel of suitable properties can be injected in any suitable manner into the formation at a pressure sufficient to fracture the formation. In said combination-acidizing treatment, a suitable acid is injected subsequent to formation of the fracture to react with, etch, and roughen the fracture faces to provide good conductivity when the operation is completed. Further details of techniques which can be employed in these embodiments of our invention are disclosed in U.S. Pat. No. 3,727,688, issued Apr. 17, 1973, in the name of Richard L. Clampitt.

When it is desired to plug a fracture in a formation, a suitable gel of the invention is introduced in any suitable manner into the fracture and maintained therein in a quiescent state for a period of time sufficient for said gel to develop sufficient gel strength to remain in place in said fracture. In many instances a period of time within the range of 8 to 48 hours will be sufficient, and is preferred. However, longer periods, e.g., up to about 5 days can be used. If desired filler materials such as silica flour, diatomaceous earth, ground nutshells, finely divided natural sands, clay or clay-like materials such as Illite clay and kaolin, and finely divided plastic particles such as Microethene, etc., can be incorporated in the aqueous gels used in this embodiment of the invention. Diatomaceous earth is a presently preferred filler material.

The following examples will serve to illustrate the invention.

EXAMPLE I

A 10,000 ppm by weight solution of Kelzan XC polymer was prepared by adding five grams of said polymer to 500 ml of a standard laboratory synthetic Arkansas River Water and mixing on a Hamilton Beach malt mixer. The resulting solution was then heated to 90° to 95°C. for 20 minutes in a water bath.

Said synthetic Arkansas River water was prepared by adding 0.763 grams of NaCl, 0.297 grams of $CaCl_2$, and 0.250 grams of $MgCl_2.6H_2O$ to one liter of distilled water.

A synthetic North Burbank Unit produced brine was prepared by adding 66.6 grams of NaCl, 15.3 grams of $CaCl_2$, 5.1 grams of $MgCl_2.6H_2O$ and 1.33 grams of $BaCl_2$ to 1 liter of distilled water.

Portions of the above-described 10,000 ppm polymer solution were then diluted with the above-described waters to prepare four 1250 ppm polymer solutions as follows:

a. 1250 ppm polymer in Arkansas River Water
b. 1250 ppm polymer in Arkansas River Water c. 1250 ppm polymer in North Burbank Unit Brine
d. 1250 ppm polymer in North Burbank Unit Brine.

Gelation of a 400 ml portion of each of said 1250 ppm polymer solutions was then carried out by adding gelling agents thereto, in accordance with the invention, as given below. Said gelling agents were added in the form of aqueous solutions (10 wt.%) in amounts sufficient to provide the indicated weights of each agent.

Solution (a) 0.1 gram of $Na_2S_2O_4$ and 0.1 gram of $Na_2Cr_2O_7.2H_2O$

Solution (b) 0.07 gram of hydroquinone and 0.1 gram of $Na_2Cr_2O_7.2H_2O$

Solution (c) 0.1 gram of $Na_2S_2O_4$ and 0.1 gram of $Na_2Cr_2O_7.2H_2O$

Solution (d) 0.07 gram of hydroquinone and 0.1 gram of $Na_2Cr_2O_7.2H_2O$

All of the above solutions containing said gelling agents had gelled after standing overnight (approximately 15 hours). Viscosity determinations on said ungelled and gelled solutions using a model 35 Fann V-G viscosimeter with a No. 1 spring were as follows:

| Fann RPM | Apparent Viscosity, cp Ungelled Solns. (a) & (b) | (c) & (d) | Gelled Solns. (a) | (b) | (c) | (d) |
|---|---|---|---|---|---|---|
| 3 | 150.0 | 150.0 | 550.0 | Too | 450.0 | 280.0 |
| 6 | 90.0 | 90.0 | 365.0 | Thick | 250.0 | 185.0 |
| 100 | 14.4 | 12.6 | 73.2 | to | 64.5 | 57.0 |
| 200 | 9.3 | 9.0 | 52.5 | Meas- | 48.0 | 44.8 |
| 300 | 7.5 | 7.3 | 43.0 | ure | 44.0 | 46.5 |
| 600 | 5.2 | 5.0 | 30.0 |  | 32.5 | 40.0 |

The above data demonstrate that gels in accordance with the invention can be produced with waters having a wide range of total dissolved solids content, and also using markedly different reducing agents.

EXAMPLE II

Two Kelzan XC polymer solutions, 2500 ppm by weight and 5000 ppm by weight, mixed in Bartlesville tap water, were gelled to a semi-solid state overnight by adding 0.2 grams of $Na_2S_2O_4$ and 0.2 grams of $Na_2Cr_2O_7.2H_2O$ to 400 milliliter portions of each polymer solution.

EXAMPLE III

A series of runs was made to compare the efficiency of the gelling agents of this invention, e.g., newly reduced $Cr^{+3}$ ion obtained by reducing $Cr^{+6}$ in situ in the solution to be gelled with a reducing agent, with the gelling agents of the Patton et al U.S. Pat. No. 3,243,000, e.g., $Cr^{+3}$ ion obtained from $CrCl_3.6H_2O$ wherein the chromium has an initial valence of +3. The procedure followed in making said runs was essentially like that set forth in Example 3 of said Patton et al patent.

For these runs a base solution containing 1 pound per barrel (3000 ppm by weight) of Kelzan MF was prepared. The water used was a 1 weight percent NaCl solution (brine) in distilled water. This brine was chosen to simulate waters frequently found and/or used in oil field operations.

For making the comparative tests, 10 aliquot samples of said base solution were taken. To five of said samples there was added $CrCl_3.6H_2O$ (10 wt. % solution) in amounts sufficient to provide $Cr^{+3}$ ion concentrations ranging from 58.5 to 527 ppm by weight. To five other of said samples there was added $Na_2Cr_2O_7.2H_2$ (10 wt. % solution) in amounts sufficient to provide $Cr^{+6}$ ion concentrations ranging from 58.5 to 527 ppm by weight, and sufficient $NaHSO_3$ (10 wt. % solution) to reduce said $Cr^{+6}$ ions to $Cr^{+3}$ ions. Each of said ten samples was then stirred at about 5000 rpm on a Hamilton Beach malt mixer. To the fine $CrCl_3$ containing samples there was then added 1.6 ml of one normal NaOH solution, after which these samples were stirred at about 5000 rpm on said mixer. All ten of said samples were allowed to stand overnight in sealed bottles. Each of the ten samples was then again stirred at about 5000 rpm on said mixer. Apparent viscosities, plastic viscosities, and yeild points were then determined on each sample in conventional manner employing Model 35 Fann viscosimeters. The results of said tests are set forth in Table I below.

Table I

| | Comparison of Gelation Systems | | | | | | | |
|---|---|---|---|---|---|---|---|---|
| | $Cr^{+3}$ Conc. ppm | | App. Viscosity cp at 1022 sec$^{-1}$ | | Plastic Viscosity, cp | | Yield Point lbs/100 ft.$^2$ | |
| Sample No. | This Inv. | Patton et al | This Inv. | Patton et al | This Inv. | Patton et al | This Inv. | Patton et al |
| Base Solution | 0 | 0 | 10 | 10 | 6 | 6 | 8 | 8 |
| 1 | 58.5 | 58.5 | 25 | 15 | 12 | 8 | 26 | 14 |
| 2 | 117.0 | 117.0 | 36.5 | 19 | 15 | 8 | 43 | 22 |
| 3 | 175.5 | 175.5 | 39.0 | 20 | 21 | 12 | 36 | 16 |
| 4 | 351.0 | 351.0 | 33.0 | 19 | 19 | 11 | 28 | 16 |
| 5 | 527.0 | 527.0 | 34.0 | 22.5 | 17 | 10 | 34 | 25 |

A comparison of the above data shows that the gelling system of this invention is more efficient than the gelling system of said Patton et al patent. For example, comparing the apparent viscosities shows that at all levels of chromium concentration, the gels produced with the newly reduced $Cr^{+3}$ had significantly higher viscosities. Thus, when using the gelling system of this invention, less polymer would be required to obtain a given viscosity.

Approximately one week after completion of the above described test runs it was observed that syneresis was taking place in the gels prepared by using $CrCl_3.6H_2O$. This is evidence of gel instability. No indication of syneresis was observed in the gels prepared by using $Cr^{+3}$ ions newly reduced in situ from $Cr^{+6}$. From these observations it was concluded that the gels prepared by using $Cr^{+3}$ ions newly reduced from $Cr^{+6}$ were more stable than the gels prepared by using $CrCl_3 \cdot 6H_2O$.

EXAMPLE IV

A run was made to determine the effect of gelled solutions of biopolysaccharides in reducing the flow of gas in porous formations. This run was carried out in a core taken from the Vacuum Abo field in Lea County, New Mexico, and using a gelled solution of Kelzan MF in a simulated or synthetic Vacuum Abo field brine. Said brine contained about 58,000 ppm by weight of total dissolved solids and was prepared by adding the following salts to distilled water.

| Salt | Grams per liter |
|---|---|
| NaCl | 52.1 |
| $CaCl_2$ | 3.4 |
| $MgSO_4$ | 2.67 |
| $CaSO_4 \cdot 2H_2O$ | 2.53 |

The gelled solution of Kelzan MF was prepared by using 2,000 ppm by weight of Kelzan MF, 100 ppm by weight of $Na_2Cr_2O_7 \cdot 2H_2O$, and 400 ppm by weight of $Na_2S_2O_4$ in said synthetic Vacuum Abo brine.

The core employed in this run was artificially fractured and had an initial specific permeability to nitrogen gas of 113 Darcys. Said core had a length of 8.5 centimeters and a diameter of 2.5 centimeters. Said core was sealed into a closely fitting aluminum sleeve with a viscous epoxy resin. The ends of said sleeve were provided with suitable inlet and outlet fittings for the introduction of fluids and passing same lengthwise through said core. Prior to making the test run the core was first flooded with said synthetic Vacuum Abo brine and then flooded with hexadecane.

Nitrogen gas was then injected into the hexadecane saturated core for a period of 4.8 days at a calculated pressure gradient of 3.6 psi per foot length of core. During this injection the outlet end of the core was open to atmospheric pressure. At the end of said 4.8 days it was calculated from the nitrogen flow rate, the inlet pressure, and the outlet pressure, using Darcy's equation, that the permeability of the core to nitrogen was 76 percent of said initial specific permeability.

A 30 milliliter slug of a newly prepared gelled solution of Kelzan MF (prepared as described above) was then injected into the core. Said gelled solution was permitted to remain in place in the core and age for 5 days. This served to "block" the core and reduce its permeability to gas.

Injection of nitrogen gas was then resumed. The permeability to nitrogen gas of the thus treated core containing the aged gel solution was essentially zero. It was noted that the permeability of the core to the nitrogen gas slowly increased. After injection of nitrogen for about 8.7 days at a calculated pressure gradient of 3.6 psi per foot length of core, it was calculated that the permeability of the core to nitrogen was about 1.7 percent of said initial specific permeability. After about 12.8 days the permeability of the core to nitrogen was calculated to be about 9.9 percent of said initial specific permeability.

The gas pressure was then increased to a pressure gradient of about 7.2 psi per foot length of core. After 17 more days, total of 29.8 days, it was calculated that the permeability of the core to gas was about 16 percent of said initial specific permeability. After 13.8 more days, total of 43.6 days, the calculated permeability of the core to gas was about 19 percent of said initial specific permeability.

The gas pressure was then increased to a pressure gradient of about 14.3 psi per foot length of core. After 11 days, total of about 54.6 days, the calculated permeability of the core to gas had increased to only about 23 percent of said initial specific permeability.

The gas pressure was then decreased to a pressure gradient of about 10.4 psi per foot length of core. After about 9.7 additional days of gas injection, total of about 62.3 days, the calculated permeability of the core to gas was found to be about only 22 percent of said initial specific permeability.

EXAMPLE V

A 1 percent by weight (10,000 ppm) solution of Kelzan MF was prepared by dissolving 5.53 grams of said Kelzan MF in 500 ml of distilled water with stirring on an Osterizer. The resulting solution was heated to 90° to 95°C. in a water bath for 30 minutes. Said Kelzan MF is a commercially available biopolysaccharide, prepared by the action of Xanthomonas campestris on a carbohydrate, and sold by the Kelco Company.

Eight aliquot portions of said kelzan MF solution were then each diluted with a sufficient quantity of a brine containing about 51,000 ppm by weight total dissolved solids to give eight solutions each containing 250 ppm by weight of polymer. The composition of said brine, in grams per liter, was as follows: NaCl, 40.3; $CaCl_2$, 10.6; and $MgCl_2 \cdot 6H_2O$, 4.8.

To each of said 250 ppm polymer solutions $Na_2Cr_2O_7 \cdot 2H_2O$ was added, in the amounts indicated in Table II below, with stirring until dissolved. The amounts of $Na_2S_2O_4$ indicated below were then added with stirring until dissolved and the dichromate color disappeared.

Table II

| Solution No. | $Na_2Cr_2O_7 \cdot 2H_2O$ grams | ppm | $Na_2S_2O_4$ grams | ppm |
|---|---|---|---|---|
| 1 | 0.075 | 75 | 0.25 | 25 |
| 2 | 0.050 | 50 | 0.20 | 20 |
| 3 | 0.030 | 30 | 0.10 | 10 |
| 4 | 0.010 | 10 | 0.10 | 10 |
| 5 | 0.005 | 5 | 0.10 | 10 |
| 6 | 0.003 | 3 | 0.10 | 10 |
| 7 | 0.001 | 1 | 0.10 | 10 |
| 8 | 0.0005 | 0.5 | 0.10 | 10 |

Each of the resulting solutions was then aged overnight at 120°F., stirred by hand, cooled, and the viscosity determined employing a Brookfield LVT-UL viscometer at 6 rpm. Viscosity measurements were then made daily on each solution to determine the effect of aging. Said solutions were stored at 77°F. between viscosity determinations. The results are given below in Table III.

Table III

| Solution No. | Brookfield LVT-UL Viscosity at 6 rpm, cp, after aging, days | | | | | | | | |
|---|---|---|---|---|---|---|---|---|---|
| | 1 | 2 | 3 | 4 | 5 | 6 | 7 | 8 | 11 |
| 1 | 9.5 | 12.5 | 17.6 | 15.2 | 15.6 | 15.6 | 14.8 | 11.4 | 10.3 |
| 2 | 7.3 | 11.4 | 24.5 | 37.0 | 38.4 | 29.3 | 20.7 | 16.5 | 12.2 |
| 3 | 6.6 | 5.5 | 6.6 | 6.6 | 7.5 | 9.0 | 11.1 | 11.5 | 13.6 |
| 4 | 2.9 | 2.8 | 3.2 | 3.1 | 2.7 | 3.1 | 3.2 | 2.7 | 3.2 |
| 5 | 2.7 | 2.6 | 2.4 | 2.5 | 2.6 | 2.7 | 2.8 | 2.8 | 2.8 |
| 6 | 2.7 | 3.0 | 3.0 | 3.1 | 2.7 | 2.8 | 3.4 | 2.9 | 3.0 |
| 7 | 3.3 | 3.5 | 3.5 | 3.6 | 3.5 | 3.6 | 3.9 | 3.6 | 3.7 |
| 8 | 2.6 | 3.1 | 3.1 | 3.0 | 2.7 | 2.8 | 2.9 | 3.0 | 2.7 |

The viscosity of the ungelled Kelzan MF solution in the 51,000 ppm brine was 5.2 cp. It will be noted that the viscosities of solutions 4 to 8 were less than the viscosity of the ungelled Kelzan MF solution. However, as shown by the next example, these solutions would still have utility for mobility control in formations of low permeability.

While it is not intended to limit the invention by any theories as to reaction mechanisms, it is presently believed that in solutions 4 to 8 only a partial gelation has occurred, i.e., the amount of gelation which has occurred is insufficient to cause an increase in the viscosity of the solution as in solutions 1 to 3. It is presently believed that in said solutions 1 to 3 the greater amount of gelation which there occurred has resulted in a gel network or structure which includes therein, and has effectively removed from the solution, a sufficient amount of the water originally present in the solution to cause an increase in the viscosity of the solution. It is also believed that in said solutions 4 to 8 the resulting gel network or structure is less extensive and includes less water therein, but has effectively removed from the solution a sufficient amount of the polymer to cause a decrease in the viscosity of the solution. Thus, in the practice of the invention it is not necessary in all instances to obtain sufficient gelation to cause an increase in viscosity of the original starting polymer solution.

EXAMPLE VI

Mobility control tests were carried out on the dichromate and hydrosulfite treated solutions of Example V above. These tests were carried out in a linear displacement model (glass bead pack). Said glass bead pack comprised a cylinder having an internal diameter of 1 inch and an effective length of 4 inches. The cylinder was filled and packed (by vibration) with fine glass beads of 10 to 53 micron size. Pressure taps located 1 inch, from each end of the cylinder and at the middle divided the cell into four 1 inch sections. A small inverted U-shaped tube was connected to the efflux end of the cell with the outlet of said tube positioned at a level just higher than the cell (with the cell in a horizontal position). A three-way stopcock was connected to the inlet end of the cell. Conduits for the liquids to be tested were connected to said stopcock. The thus prepared cell had a nominal permeability in the order of 500 millidarcys, a porosity of about 45 percent, and a pore volume of about 22 milliliters.

In making mobility tests using the above-described cell, the various liquids are pumped into the cell at uniform rates and pressure readings are taken at the pressure taps along the cell. The data thus obtained are employed to calculate mobility values using Darcy's linear flow equation. Said equation can be written as follows:

$$\frac{K}{\mu} = \frac{QL}{A\Delta P}$$

wherein the factor $K/\mu$ represents mobility expressed in permeability (millidarcys) divided by the viscosity of the liquid, Q represents flow rate in cubic centimeters per second, L represents the length of the cell in centimeters, A represents the cross-sectional area of the column in square centimeters, and $\Delta P$ represents the differential pressure in atmospheres. Since L and A are constant for any given cell, mobility can be readily calculated from $Q/\Delta P$.

In this example, it was desired to measure the relative mobility (RM) of two liquids in a porous medium, e.g., a brine and a gelled polymer solution. RM can be defined as the ratio of the calculated mobility of the gelled polymer solution in the porous medium (after injecting said brine) to the calculated mobility of said brine in the porous medium (before injecting said gelled polymer solution. Since calculated mobility = $Q/\Delta P$, as set forth above, then RM can be expressed as $$RM = \frac{Q/\Delta P \text{ of gelled polymer solution}}{Q/\Delta P \text{ of brine}}$$

Retained relative mobility (RRM) is a measure of the resistance of said polymer solution to washout or elution from the porous medium. RRM can be defined as the ratio of the calculated mobility of said brine after treatment of the porous medium with said gelled polymer solution to the calculated mobility of said brine before treatment of the porous medium with said gelled polymer solution, and can be expressed as $$RRM = \frac{Q/\Delta P \text{ of said brine after polymer treatment}}{Q/\Delta P \text{ of said brine before polymer treatment}}$$

In this example, mobility tests were carried out by first introducing about 5 pore volumes (PV) of brine at a uniform rate to provide ample time for the flow rate through the cell to reach equilibrium. When injection is first started the cell is turned vertically so that the air therein is driven out the top. The cell is then turned to horizontal position. Next, data were taken to calculate the mobility of the brine in each section of the cell. Data required are volume of flow for a given period of time (about 5 minutes), and pressure readings at each of said pressure taps, at the cell outlet, and the cell inlet. After determining said brine mobility, like data were taken to determine the mobility of the gelled polymer solutions in each section of the cell. This was done by switching the three-way stopcock to polymer solution flow and introducing about 5 PV of gelled polymer solution into the cell. After determining said gelled polymer solution mobility, like data were taken to determine the mobility of the brine in each section of the cell after said polymer solution treatment. This was done by switching the three-way stopcock to brine flow and introducing about 5 PV of brine into the cell. A continuous flow was maintained during said switching from one liquid to the other. Data readings were taken at ½ PV intervals. The brine used in these tests contained about 51,000 ppm by weight total dissolved solids and had essentially the same composition as the brine used in Example V. The injection pressure of all said liquids was essentially the same because all of said liquids were introduced from containers positioned 150 centimeters above the outlet of the U-tube connected to the efflux end of the cell.

Mobility tests on the samples of Table II, Example V were run in the manner described. Said samples were run in reverse order so that the runs could be terminated if plugging was encountered with the more viscous samples. Face plugging was encountered when 2.6 PV of sample No. 4 had been injected into the cell and samples 3, 2, and 1 were not run. A position of sample No. 4 was filtered and the run repeated. From the data obtained in these runs RM and RRM values were calculated as described above. The RM and RRM values thus obtained are set forth in Table IV below. RM and RRM values were determined in the same manner on an untreated 250 ppm Kelzan MF solution of Example V. These data are also set forth in Table IV below.

ated. The pipe was then flooded from the bottom with a NBU synthetic brine so as to remove all traces of gas therefrom. Said synthetic brine contained about 88,400 ppm by weight total dissolved solids and had the following composition in grams per liter: NaCl, 66.6; $CaCl_2$, 15.3; $BaCl_2$, 1.33; and $MgCl_2.6H_2O$, 5.1. The column was then flooded in horizontal position with a refined oil having a viscosity of 23 centipoises at 75°F so as to establish an oil saturation and residual connate water saturation condition. The column was then flooded with 845 milliliters of the above-described synthetic NBU brine for a sufficient period of time to give an exit water-to-oil ratio in excess of 100:1, and thus insure that all mobile oil had been removed therefrom. The column was then considered to be residual oil saturated.

The thus prepared linear displacement model had a pore volume of 65 milliliters and a porosity of 39.0 percent. The column was mounted in a horizontal position and provided with a pressure tap 3 inches from the injection end. Water diversion tests were then carried out as described below, with all liquids being pumped into one end of the column.

In making water diversion tests using the above described column, the various liquids are pumped into the column at uniform rates (180 ml per hour) and pressure readings are taken at the pressure tap on the column. The data thus obtained are employed to calculate mobility values using Darcy's linear flow equation in the manner described in the second paragraph of Ex- Table IV

| Sample No. | Relative Mobility — RM | | | | Retained Relative Mobility — RRM | | | |
|---|---|---|---|---|---|---|---|---|
| | Sect. 1 | Sect 2 | Sect 3 | Sect 4 | Sect 1 | Sect 2 | Sect 3 | Sect 4 |
| 8[1] | 0.22 | 0.21 | 0.21 | 0.23 | 0.66 | 0.49 | 0.48 | 0.53 |
| 7[1] | 0.14 | 0.14 | 0.16 | 0.17 | 0.55 | 0.38 | 0.45 | 0.50 |
| 6[2] | 0.15 | 0.18 | 0.18 | 0.20 | 0.46 | 0.37 | 0.37 | 0.43 |
| 5[2] | 0.11 | 0.15 | 0.19 | 0.19 | 0.17 | 0.25 | 0.35 | 0.32 |
| 4[2] | 0.03 | 0.42 | 0.32 | 0.22 | 0.06 | 1.0 | 1.0 | 0.6 |
| 4[2]* | 0.03 | 0.11 | 0.14 | 0.15 | 0.06 | 0.23 | 0.16 | 0.36 |
| 3[2] | 0.0006 | | | | | | | |
| Untreated Kelzan MF | Average[3] RM = 0.30 | | | | Average[3] RRM = 0.76 | | | |

[1] aged 5 days
[2] aged 6 days
*filtered solution
[3] average of results from sections 2 and 3 of the cell The above data indicate that samples 5 to 8 would be effective water or brine diversion agents in porous media having a permeability comparable to that of the glass bead packs employed in the test runs. As the RRM becomes smaller the sample is more effective as a water diversion agent. In other words the permeability to brine following injection of the treated Kelzan MF solutions is less than the permeability to brine following injection of the untreated Kelzan MF solution. For example, the RRM (average value = 0.25) after injection of sample 5 was less than the 0.76 value obtained following injection with the untreated Kelzan MF solution.

EXAMPLE VII

A linear displacement model (sand pack) was prepared as follows. A Lucite pipe 12 inches long having in I.D. of 1.0625 inches was filled with Ottawa sand. The filled pipe was then evacuated to remove air. The evacuated pipe was then flooded with $CO_2$ gas to further remove any air. The pipe was then again evacuample VI given above. If desired, in employing the data, mobility values can be plotted as the ordinate versus cumulative volume injected as the abscissa.

In this example, the above-described injection of 845 milliliters of said synthetic NBU brine to establish the residual oil saturation was also used to establish brine mobility at said residual oil saturation condition.

The column was then flooded with 300 milliliters of a 500 ppm by weight solution of Kelzan MF in synthetic A-B water. Said synthetic A-B water had a total dissolved solids content of about 1,315 ppm by weight, and had the following composition, in grams per liter: NaCl, 0.768; $CaCl_2$, 0.297; and $M_gCl_2.H_2O$, 0.250.

The column was then flooded with 650 milliliters of said synthetic NBU brine. This was followed with 310 milliliters of a 500 ppm by weight gelled solution of Kelzan MF in said synthetic A-B water. Said gelled solution of Kelzan MF was prepared in accordance with the invention by the addition of 50 ppm by weight of $Na_2Cr_2O_7.2H_2O$ and 75 ppm by weight of $NaHSO_3$ to a portion of said ungelled 500 ppm Kelzan MF solution.

The column was then flooded with 200 milliliters of said synthetic NBU brine. The column was then flooded with 200 milliliters of an ungelled 1,000 ppm by weight solution of Kelzan MF in said synthetic A-B water. The column was then flooded with 585 milliliters of said synthetic NBU brine. Next, the column was flooded with 140 milliliters of a 1000 ppm by weight gelled solution of Kelzan MF in said synthetic A-B water. Said 1000 ppm gelled solution of Kelzan MF was prepared by the addition of 100 ppm of $Na_2Cr_2O_7 \cdot 2H_2O$ and 125 ppm of $NaHSO_3$ to a portion of said ungelled 1000 ppm Kelzan MF solution. The column was then flooded with 1435 milliliters of said synthetic NBU brine to establish a final resistance factor.

Throughout the introduction of said liquids, pressure readings were taken at the entrance to the column, at said pressure tap, and at the outlet of the column. Mobility values for each liquid were calculated from said injection rate and the pressure readings, as described above. Residual resistance factors (RRF) were also calculated. The results of said tests are set forth in Table V given below.

the gelled 500 ppm Kelzan MF solution was no more effective than the ungelled Kelzan MF solution. The mobility of the subsequent injection of the NBU brine was 9,212 md/cp and the RRF was 0.67, indicating that said 500 ppm gelled solution of Kelzan MF was not effective in reducing the final mobility to brine. The treatment with the 1000 ppm ungelled solution of Kelzan MF also was not effective in reducing the mobility of the sand pack to the subsequent brine injection. However, the injection of the gelled solution of 1000 ppm Kelzan MF reduced the mobility to brine to a final value of 203 md/cp, as compared to an initial brine mobility of 6,206 md/cp, and the final resistance factor (RRF) was 30.6, showing that the 1000 ppm gelled solution of Kelzan MF was markedly effective in reducing the mobility of the brine in the sand pack.

This Example VII, along with Example VI, is an illustration of what can be accomplished in the practice of the invention when one tailors or matches the composition and properties of the gelled polymer solutions to the permeability and other characteristics of the porous media. For example, the 250 ppm gelled Kelzan MF so- Table V

| Liquid | Cumulative Vol. of Liquid, ml. | Total Cumulative Vol. of Liquid Inj., ml | Mobility md/cp | RRF |
|---|---|---|---|---|
| Brine | 50 | 50 | 27,100 | |
| | 100 | 100 | 27,100 | |
| 23 Cp Oil | 105 | 205 | 780 | |
| | 155 | 255 | 894 | |
| | 180 | 280 | 1,016 | |
| Brine | 580 | 860 | 6,033 | |
| | 805 | 985 | 6,329 | |
| | 845 | 1035 | 6,206 | 1.0 |
| Ungelled 500 ppm | 60 | 1095 | 3,346 | |
| Kelzan MF solution | 150 | 1185 | 2,926 | |
| | 300 | 1335 | 3,043 | 2.0 |
| Brine | 100 | 1435 | 7,089 | |
| | 650 | 1985 | 8,775 | 0.71 |
| Gelled 500 ppm | 120 | 2105 | 3,007 | |
| Kelzan MF solution | 240 | 2225 | 3,190 | |
| | 310 | 2295 | 3,055 | 2.0 |
| Brine | 50 | 2345 | 5,626 | |
| | 100 | 2395 | 8,416 | |
| | 200 | 2495 | 9,212 | 0.67 |
| Ungelled 1000 ppm | 40 | 2535 | 5,792 | |
| Kelzan MF solution | 100 | 2595 | 1,286 | |
| | 150 | 2745 | 1,460 | |
| | 200 | 2795 | 1,641 | 3.78 |
| Brine | 110 | 2905 | 7,008 | |
| | 585 | 3380 | 8,521 | 0.73 |
| Gelled 1000 ppm | 60 | 3440 | 773 | |
| Kelzan MF solution | 100 | 3480 | 231 | |
| | 140 | 3520 | 164 | 37.8 |
| Brine | 100 | 3620 | 160 | |
| | 260 | 3780 | 163 | |
| | 360 | 3880 | 172 | |
| | 1035 | 4555 | 198 | |
| | 1435 | 4955 | 203 | 30.6 |

Referring to the above Table V, the mobility of the brine in the column was initially 6,206 md/cp, and the RRF was 1.0. The mobility of the ungelled 500 ppm Kelzan MF solution at the end of the injection thereof was 3,043 md/co, and the RRF was 2.0. The mobility of the succeeding brine injection increment increased to 8,775 md/cp finally and the RRF was 0.71, showing that the brine washed out the previously injected ungelled Kelzan MF solution, and that said ungelled Kelzan MF solution was ineffective in reducing the permeability of the column and/or decreasing the mobility of the brine. The mobility of the 500 ppm gelled solution of Kelzan MF was 3,055 md/cp finally, indicating that lution which exhibited a significant water diversion effect in the 500 millidarcy glass bead pack of Example VI would not be effective in the more permeable 6200 millidarcy sand pack of Example VII. In considering the two examples, it should be remembered that RRM is the reciprocal of RRF.

While certain embodiments of the invention have been described for illustrative purposes, the invention is not limited thereto. Various other modifications or embodiments of the invention will be apparent to those skilled in the art in view of this disclosure. Such modifications or embodiments are within the spirit and scope of the disclosure.

We claim:
1. In a method wherein a fluid medium is introduced into a borehole in the earth and into contact with a subterranean formation penetrated by said borehole, the improvement wherein at least a portion of said fluid medium comprises an aqueous gel, and wherein said gel comprises water having incorporated therein:
- a water thickening amount of a water-soluble biopolysaccharide produced by the action of bacteria of the genus Xanthomonas on a carbohydrate;
- an amount of a water-soluble compound of a polyvalent metal wherein the metal present is capable of being reduced to a lower polyvalent valence state and which amount is sufficient to cause gelation of said water when the valence of at least a portion of said metal is reduced to said lower valence state; and
- an amount of a water-soluble reducing agent which is effective to reduce at least a portion of said metal to said lower valence state.

2. A method according to claim 1 wherein said aqueous gel comprises water having incorporated therein:
- from 0.0025 to 5 weight percent of said polysaccharide, based upon the weight of said water;
- from 0.1 to 60 weight percent of said polyvalent metal compound based upon the weight of said polysaccharide;
- from 0.1 to at least about 200 percent of the stoichiometric amount of said reducing agent required to reduce said polyvalent metal to said lower polyvalent valence state.

3. A method according to claim 2 wherein said compound of polyvalent metal is a compound of chromium wherein the valence of the chromium is +6 and the valence of at least a portion of said chromium is reduced to +3.

4. A method according to claim 3 wherein said chromium compound is selected from the group consisting of ammonium chromate, ammonium dichromate, the alkali metal chromates and dichromates, chromium trioxide, and mixtures thereof.

5. A method according to claim 4 wherein said reducing agent is selected from the group consisting of hydroquinone, sodium sulfide, hydrogen sulfide, sodium hydrosulfite, potassium hydrosulfite, sodium metabisulfite, potassium sulfite, sodium bisulfite, potassium bisulfite, sodium metabisulfite, potassium metabisulfite, sodium sulfite, sodium thiosulfate, potassium thiosulfate, ferrous sulfate, ferrous chloride, p-hydrazinobenzoic acid, hydrazine phosphite, hydrazine dihydrochloride, thioacetamide and mixtures thereof.

6. A method according to claim 2 wherein:
- said polysaccharide has been produced by Xanthomonas campestris;
- said polyvalent metal compound is sodium dichromate; and
- said reducing agent is selected from the group consisting of sodium or potassium hydrosulfite, sodium or potassium sulfite, sodium or potassium bisulfite, sodium or potassium metabisulfite, sodium or potassium thiosulfate, and mixtures thereof.

7. A method according to claim 6 wherein:
- the amount of said polysaccharide is within the range of from 0.025 to 1 weight percent; and
- the amount of said polyvalent metal compound is within the range of from about 4 to 30 weight percent.

8. A method according to claim 1 wherein said polysaccharide is one produced by *Xanthomonas campestris*.

9. A method according to claim 1 wherein:
- said borehole comprises an injection well;
- said formation comprises an oil bearing formation and is also penetrated by a production well;
- said method is a fluid drive process carried out for the recovery of oil from said formation by injecting a drive fluid into said formation via said injection well and driving oil to said production well; and
- said fluid medium comprising said aqueous gel is introduced into said injection well and into the pores of said formation.

10. A method according to claim 9 wherein:
- said formation is of nonuniform permeability and comprises at least one zone of relatively high permeability and at least one zone of relatively low permeability; and
- said fluid medium is injected into said formation prior to injecting drive fluid into said formation via said injection well in said fluid drive process for driving said oil to said production well.

11. A method according to claim 10 wherein said aqueous gel comprises water having incorporated therein:
- from 0.025 to 1 weight percent of said polysaccharide, based upon the weight of said water;
- from 0.5 to 30 weight percent of said polyvalent metal compound based upon the weight of said polysaccharide;
- from 0.5 to at least about 150 percent of the stoichiometric amount of said reducing agent required to reduce said polyvalent metal to said lower polyvalent valence state.

12. A method according to claim 11 wherein:
- said polysaccharide has been produced by Xanthomonas campestris;
- said polyvalent metal compound is sodium or potassium dichromate; and
- said reducing agent is selected from the group consisting of sodium or potassium hydrosulfite, sodium or potassium sulfite, sodium or potassium bisulfite, sodium or potassium metabisulfite, sodium or potassium thiosulfate, and mixtures thereof.

13. A method according to claim 9 wherein:
- said formation is of nonuniform permeability and comprises at least one zone of relatively high permeability and at least one zone of relatively low permeability; and
- said fluid medium is injected into said formation subsequent to having injected a drive fluid into said formation via said injection well in said fluid drive process for driving said oil to said production well.

14. A method according to claim 13 wherein said aqueous gel comprises water having incorporated therein:
- from 0.025 to 1 weight percent of said polysaccharide, based upon the weight of said water;
- from 0.5 to 30 weight percent of said polyvalent metal compound based upon the weight of said polysaccharide; and
- from 0.5 to at least about 150 percent of the stoichiometric amount of said reducing agent required to reduce said polyvalent metal to said lower polyvalent valence state.

15. A method according to claim 14 wherein:

said polysaccharide has been produced by Xanthomonas campestris;

said polyvalent metal compound is sodium dichromate; and said reducing agent is selected from the group consisting of sodium or potassium hydrosulfite, sodium or potassium sulfite, sodium or potassium bisulfite, sodium or potassium metabisulfite, sodium or potassium thiosulfate, and mixtures thereof.

16. A method according to claim 1 wherein:

said method comprises a method for drilling a said borehole into the earth;

a drill bit is actuated in said borehole in contact with said formation and penetrates same in the presence of said fluid medium; and said fluid medium, together with formation solids entrained therein, is removed from said borehole.

17. A method according to claim 16 wherein said aqueous gel comprises water having incorporated therein:

from 0.025 to 1 weight percent of said polysaccharide, based upon the weight of said water;

from 4 to 30 weight percent of said polyvalent metal compound based upon the weight of said polysaccharide; and from 0.1 to at least about 200 percent of the stoichiometric amount of said reducing agent required to reduce said polyvalent metal to said lower polyvalent valence state.

18. A method according to claim 17 wherein:

said polysaccharide has been produced by Xanthomonas campestris;

said polyvalent metal compound is sodium dichromate; and said reducing agent is selected from the group consisting of sodium or potassium hydrosulfite, sodium or potassium sulfite, sodium or potassium bisulfite, sodium or potassium metabisulfite, sodium or potassium thiosulfate, and mixtures thereof.

* * * * *